US006831677B2

(12) United States Patent
Peleg et al.

(10) Patent No.: US 6,831,677 B2
(45) Date of Patent: Dec. 14, 2004

(54) SYSTEM AND METHOD FOR FACILITATING THE ADJUSTMENT OF DISPARITY IN A STEREOSCOPIC PANORAMIC IMAGE PAIR

(75) Inventors: Shmuel Peleg, Mevaseret Zion (IL); Moshe Ben-Ezra, Jerusalem (IL); Yael Pritch, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 640 days.

(21) Appl. No.: 09/792,638

(22) Filed: Feb. 24, 2001

(65) Prior Publication Data

US 2001/0038413 A1 Nov. 8, 2001

Related U.S. Application Data

(60) Provisional application No. 60/184,589, filed on Feb. 24, 2000.

(51) Int. Cl.[7] .................................................. H04N 7/00
(52) U.S. Cl. .......................................... 348/36; 348/46
(58) Field of Search ............................. 348/36, 42, 43, 348/44, 46, 47; 382/154, 294; H04N 7/00

(56) References Cited

U.S. PATENT DOCUMENTS 6,665,003 B1 * 12/2003 Peleg et al. .................... 348/36

* cited by examiner

*Primary Examiner*—Young Lee
(74) *Attorney, Agent, or Firm*—Fenster & Company

(57) ABSTRACT

A system for generating a stereoscopic panoramic image pair having left and right panoramic mosaic images for use in facilitating stereoscopic viewing of a panoramic scene, the system comprising a panoramic image generator and a strip separation value generation module. The panoramic image generator is configured to mosaic together respective left and right image strips from respective ones of a plurality of images to form the respective left and right panoramic images. The panoramic image generator is configured to use strip separation values for the respective images to determine the separation of the respective left and right image strips in generating the respective left and right panoramic images. The strip separation value generation module is configured to generate, for respective ones of said images, the strip separation values so as to provide at least one selected disparity for objects in the panoramic scene.

25 Claims, 5 Drawing Sheets

SYSTEM AND METHOD FOR
FACILITATING THE ADJUSTMENT OF
DISPARITY IN A STEREOSCOPIC
PANORAMIC IMAGE PAIR

INCORPORATION BY REFERENCE

This application claims the benefit of provisional application Ser. No. 60/184,589 filed Feb. 24, 2000.

U.S. patent application Ser. No. 09/396,248, filed Sep. 16, 1999, in the names of Shmuel Peleg, et al., entitled "System and Method for Generating and Displaying Panoramic Images and Movies," assigned to the assignee of the present application, incorporated herein by reference.

FIELD OF THE INVENTION

The invention relates generally to the field of recording and generating images, and more particularly to the generation and displaying of panoramic images stereoscopically. The invention specifically provides a system and method for generating a stereoscopic panoramic image pair, comprising respective left and right panoramic images, in which disparity is controlled to provide selected effects.

BACKGROUND OF THE INVENTION

When a person views a scene with his or her eyes, the disparity, or angular difference in viewing directions by his or her eyes for each point in the scene, is interpreted by the brain as depth, or distance, to an object in the scene through a process referred to as "stereo fusion." The disparity is a function of both the distance of the object from the viewer and a baseline corresponding to, for example, the distance between the viewer's eyes, which results in an angle that the brain interprets as distance. Depth can be perceived if the disparity is in a particular angular range. If an object is too far away from a person, the disparity would be too small for depth to be perceived. The maximum stereoscopic range, however, can be extended by use of aids such as binoculars, which, in addition to magnifying, can also serve to increase the baseline. On the other hand, if the object is too close to the viewer, the disparity would be too large for stereo fusion.

Depth can also be perceived from images that have been recorded of the scene. In order to observe depth, two images are required of the same portion of the scene, one of which will be viewed by the left eye and the other of which will be viewed by the right eye. A pair of such images, which will be referred to as a stereoscopic image pair, comprises two images, which have been recorded from two different viewpoints. Since the images comprising a stereoscopic image pair are recorded from two different viewpoints, they will provide a disparity, in a manner similar to the way in which the eyes provide disparity if they were viewing the scene directly. The amount of the disparity will depend on the distance of the points in the scene from the position at which the images were recorded and the distance between the viewpoints at which the images were recorded.

U.S. patent application Ser. No. 09/396,248, filed Sep. 16, 1999, in the names of Shmuel Peleg, et al., entitled "System and Method for Generating and Displaying Panoramic Images and Movies" (hereinafter referred to as "the Peleg application") describes a system and method for generating images comprising a stereoscopic panoramic image pair, which can be viewed to provide a stereoscopic panoramic view of a scene. A stereoscopic panoramic image pair comprises two panoramic images, one of which can be viewed by the left eye and the other of which can be viewed by the right eye. In the system described in the Peleg application, each panoramic image in the stereoscopic panoramic image pair is generated from images recorded by a single camera rotated around an axis located behind the camera's center of projection. The camera is rotated around the rotational axis in a series of steps, and an image is recorded at each step. Strips from successive images are mosaiced together to form mosaic panoramic images. Generally, two strips will be obtained from each image for use in generating the mosaic panoramic images, one to the right of the center of the image and the other to the left of the center of the image, with the strips being generally parallel to the axis of rotation of the camera. As described in the Peleg application, strips that are mosaiced together for the right panoramic image will be the strips that are to the left of the center of the image (as the image is viewed), and strips that are mosaiced together for the left panoramic image will be the strips that are to the right of the center of the image. The widths of the strips, and the angle between steps at which the camera records images, is selected to ensure that each pair of strips, that is, the pair of strips to the right of the center of the image, and the pair of strips to the left of the center of the image, can be mosaiced together to form respective right and left mosaic panoramic images of the stereoscopic panoramic image pair.

As noted above, two strips will be obtained from each image for use in generating the mosaic panoramic images, one to the right of the center of the image and the other to the left of the center of the image. Since the light rays enter the camera through a lens or pinhole, the light rays that are recorded to define the strip to the right of the center will be reflected off surfaces generally directed toward the right (as seen by the camera) of in the scene, and the light rays that are recorded to define the strip to the left of the center will be reflected off surfaces generally directed to the left (as seen by the camera) of in the scene. It will be appreciated that, in an image, the left and right strips will comprise images of different objects, but when the strips are mosaiced together to form the respective left and right panoramic images, the left and right panoramic images will contain images of the same objects, although from different, that is, left and right, viewpoints. When the portions of the left and right mosaic panoramic images that are images of the same portion of the scene are simultaneously displayed to the respective left and right eyes of a viewer, the viewer will be able to observe stereoscopic depth in the same manner as if he or she had viewed the scene with his or her eyes. It will be appreciated that the separation between the locations in the camera's image plane at which the left and right strips are recorded corresponds to the baseline that can provide the disparity required to view depth stereoscopically. It will be appreciated that, for relatively distant objects, the disparity may be insufficient to allow for stereo fusion. Alternatively, depending on the variation of distance of objects in the scene from the camera, the disparity may vary widely.

SUMMARY OF THE INVENTION

The invention provides a new and improved system and method for generating a stereoscopic panoramic image pair, comprising respective left and right panoramic images, in which disparity is controlled to provide selected effects, which may include, for example, providing a minimum or maximum disparity for all objects in the scene to allow for stereo fusion therefor, adjusting disparity so to a selected range, or other effects that will be apparent to those skilled in the art.

In brief summary, the invention provides, in one aspect, a system for generating a stereoscopic panoramic image pair comprising left and right panoramic mosaic images for use in facilitating stereoscopic viewing of a panoramic scene, the system comprising a panoramic image generator and a strip separation value generation module. The panoramic image generator is configured to mosaic together respective left and right image strips from respective ones of a plurality of images to form the respective left and right panoramic images. The panoramic image generator is configured to use strip separation values for the respective images to determine the separation of the respective left and right image strips in generating the respective left and right panoramic images. The strip separation value generation module is configured to generate, for respective ones of said images, the strip separation values so as to provide at least one selected disparity for objects in the panoramic scene.

In another aspect, the invention provides a method generating a stereoscopic panoramic image pair comprising left and right panoramic mosaic images for use in facilitating stereoscopic viewing of a panoramic scene. In an initial panoramic image generation step, respective left and right image strips from respective ones of a plurality of images are mosaiced together to form the respective left and right panoramic images. During the initial panoramic image generation step a predetermined strip separation value being used to determine the separation of the respective left and right image strips in generating the respective left and right panoramic images. During an initial disparity value generation step, respective initial left and right panoramic images are processed to generate initial disparity values for projections of at least some points in the scene. During a separation value generation step, final strip separation values are generated from the initial disparity values. During a final initial panoramic image generation step, respective left and right image strips from respective ones of said plurality of images are mosaiced together to form the respective left and right panoramic images. During the final panoramic image generation step, the final strip separation values are used to determine the separation of the respective left and right image strips in generating the respective left and right panoramic images.

In yet another aspect, the invention provides a computer program product for use in connection with a programmable device to facilitate generation of a stereoscopic panoramic image pair comprising left and right panoramic mosaic images for use in facilitating stereoscopic viewing of a panoramic scene, the computer program product comprising a device-readable medium having encoded thereon a panoramic image generation module, an initial disparity value generation module, a separation value generation module, and a control module. The panoramic image generation module is configured to enable said programmable device to mosaic together respective left and right image strips from respective ones of a plurality of images to form the respective left and right panoramic images, the panoramic image generation module being enabled to use a selected strip separation value to determine the separation of the respective left and right image strips in generating the respective left and right panoramic images. The initial disparity value generation module is configured to enable said programmable device to process respective initial left and right panoramic images to generate initial disparity values for projections of at least some points in the scene. The separation value generation module is configured to enable said programmable device to generate final strip separation values from the initial disparity values. The control module is configured to (i) enable programmable device to utilize said panoramic image generation module, in the process initially using a predetermined strip separation value in generating initial left and right panoramic images for use by said initial disparity value generation module, and (ii) after the final strip generation values have been generated, enable the programmable device to utilize said panoramic image generation module, in the process using the final strip separation value in generating final left and right panoramic images.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1B:
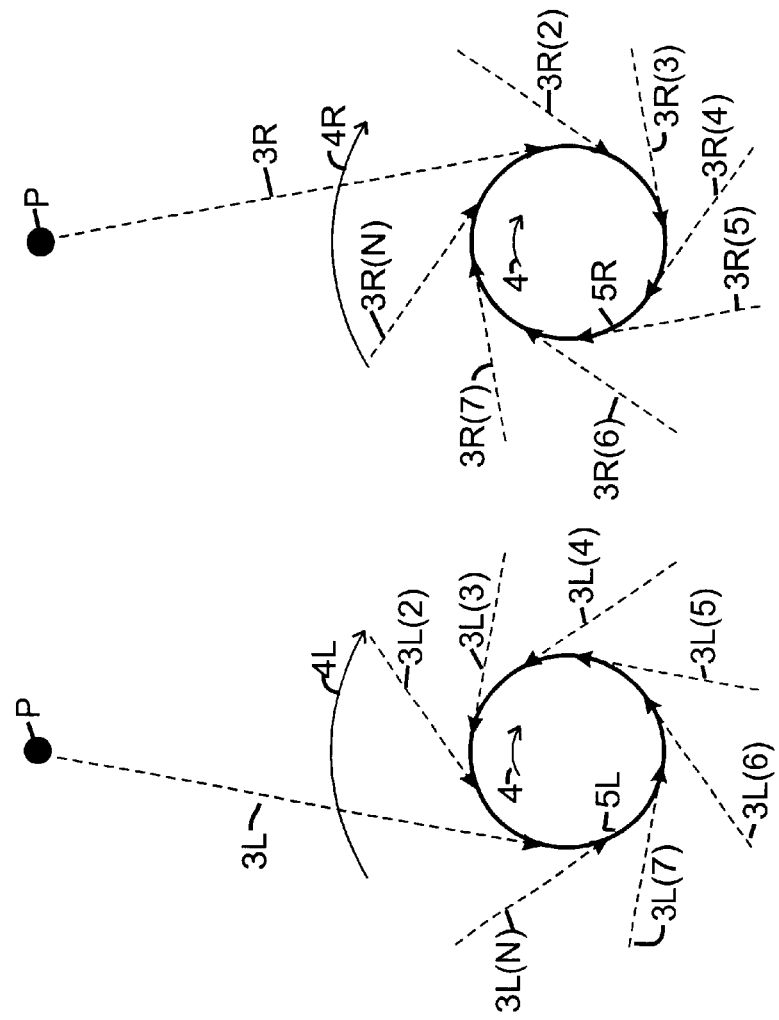
FIGS. 1A and 1B are useful in understanding operations performed by arrangements for generating and displaying stereoscopic panorama image pairs constructed in accordance with the invention.
Figure 1A:
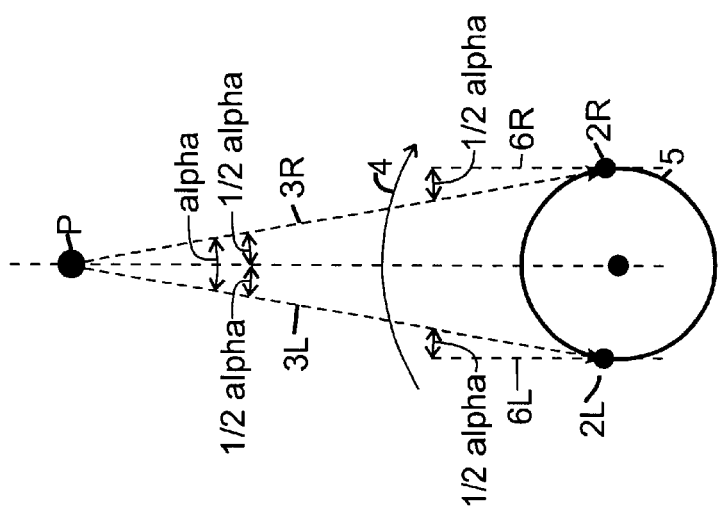

The invention provides a system and method for automatically controlling the disparity in a stereoscopic panoramic image pair. Before describing the inventive system and method, it would be helpful to first describe what a stereoscopic panoramic image is and generally how the system and method described herein controls disparity in generating the stereoscopic panoramic image pair. This will be done initially in connection with FIGS. 1A and 1B. With reference initially to FIG. 1A, that FIG. schematically depicts an observer, as seen from above, standing vertically and observing a point P directly ahead in a scene. The observer's eyes are represented by dots 2L and 2R (generally identified by reference numeral "2L/R"). The observer sees point P by means of rays of light reflected from the point and directed toward the eyes 2L and 2R along respective rays represented by dashed arrows 3L and 3R. The angle "alpha" between rays 3L and 3R corresponds to the aforementioned disparity, and as long as the distance between point P, on the one hand, and the eyes 2L and 2R, on the other hand, is such that the angle "alpha" is within a large enough range, the observer will be able to observe depth, or distance, from the observation point to the point P.

It will be appreciated that, for each eye, since the point P is directly ahead of the observer, the angle with which the ray 3L, 3R strikes the respective eye, relative to a direction straight ahead (as represented by the dashed lines 6L, 6R) of the respective eye, will be ½ alpha. For points to the left of point P (as shown in FIG. 1A), the angle, relative to the direction straight ahead, with which the ray 3L strikes the left eye 2L will be reduced, until it is straight ahead, after which the angle will increase. In addition, for points to the left of point P, the angle with which the ray 3R strikes the right eye 2R will be increased. Contrariwise, for points to the right of point P (as shown in FIG. 1A), the angle, relative to the direction straight ahead, with which the ray 3R strikes the right eye 2R will be reduced, until it is straight ahead, after which the angle will increase. In addition, for points to the right of point P, the angle with which the ray 3L strikes the left eye 2L will be increased. In any case, since the distance between observer's is fixed, for points farther away from the observer, the disparity that he or she will observe will be less than these angles whereas, for points closer to the observer, the disparity will be greater than these angles.

The observer typically can see only a small portion of the 360° panorama around himself or herself. To see more of the panorama, the observer will rotate his or her head in, for example, the direction indicated by the arrow identified by reference numeral 4. Rotation of the head will allow the observer to view other points (not shown) in the scene, along rays (also not shown) that rotate with him or her. If the observer rotates around a full 360°, each eye will revolve around the same viewing circle 5.

It will be apparent from FIG. 1A that each the succession of images as seen by the observer's two eyes as he or she rotates, can be separated into separate sets of images, with one set of images being associated with each eye. This will be described in connection with FIG. 1B. FIG. 1B, depicts the viewing circle 5 divided into separate viewing circles 5L and 5R (generally 5L/R) for the respective left and right eyes, with point P being shown in the same position as in FIG. 1A, with respect to each viewing circle 5L/R, and the associated ray 3L(1) and 3R(1), which correspond to rays 3L and 3R depicted in FIG. 1A. Each viewing circle 5L/R also depicts other rays, identified by reference numerals 3L(2), . . . , 3L(N) (generally identified by reference numeral 3L(n)) and 3R(2), . . . , 3R(N) (generally identified by reference numeral 3R(n)) that represent images of points in the scene directly ahead of the observer at the respective angular position that would strike the respective left and right eyes of the observer as he or she rotates in the direction represented by arrows 4L and 4R. As with rays 3L and 3R (FIG. 1A), the angle between rays 3L(n) and 3R(n) represents the disparity alpha between the viewing directions of the left and right panoramic images. In addition, at each angular position, the angle with which other points to the left or right of the point represented by the respective ray would vary in the same manner as described above in connection with FIG. 1A.

Further in connection with FIG. 1B, to facilitate the viewing of a stereoscopic panoramic image of the scene by a viewer, the images can be separately recorded and viewed by, or otherwise displayed to, the respective eyes of the viewer. Thus, if, for example, images are recorded around a circle corresponding to viewing circle 5L at successive points, in successive direction depicted by rays 3L(1), . . . 3L(N), and the images mosaiced together, and further images are recorded around a circle corresponding to viewing circle 5R at successive points, in successive direction depicted by rays 3R(1), . . . 3R(N), and if those images are suitably aligned (such that the point of intersection of the rays 3L(n) and 3R(n) are viewed in the same relative location) and displayed to respective eyes of a viewer, the viewer can see a stereoscopic panoramic image of the scene.

In a similar manner, stereoscopic panoramic image pairs can be generated using computer graphics techniques. However, instead of the regular perspective projection used in conventional image rendering, the panoramic image for the left eye will be rendered using rays tangent to a circle such as viewing circle 5L, and the panoramic image for the right eye will be rendered using rays tangent to a circle such as viewing circle 5R.

As noted above, when a person views a scene with his or her eyes, the disparity is interpreted by the brain as depth. As further noted above, disparity is a function of both the distance of the point from the viewer and a baseline. In this case, the disparity baseline corresponds to the diameter of the viewing circle 5. If the diameter of the viewing circle is increased, depth can be observed for points P at greater distances from the eyes. On the other hand, if the diameter of the viewing circle is decreased, the distance at which depth can be observed will be reduced. Similarly, when recording images for a stereoscopic panoramic image pair, if the diameters of the viewing circles 5L and 5R are increased or decreased, the distance at which an observer who observes the stereoscopic panoramic image pair will be able to observe depth can be increased or decreased. If the diameter of the viewing circles 5L and 5R is increased to allow the observer to observe depth at greater distances, that can have the result of exaggerating depth of objects relatively near the camera. Since, in different portions of a scene for which a panoramic image is to be generated, objects may be located at significantly different distances from the camera, it may be desirable to increase the disparity in regions of the panorama at which objects are farther from the camera, and/or decrease the disparity in regions at which objects are nearer to the camera. The invention provides an arrangement that provides for automatic control of the disparity to accomplish that.

Figure 2C:
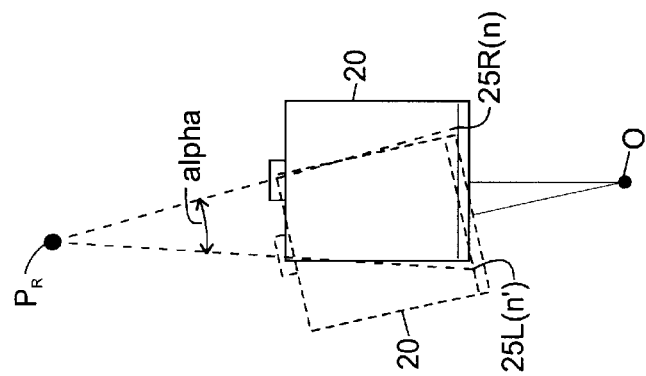
FIGS. 2A through 2C are useful in understanding generation of a stereoscopic panorama image pair.
Figure 2A:
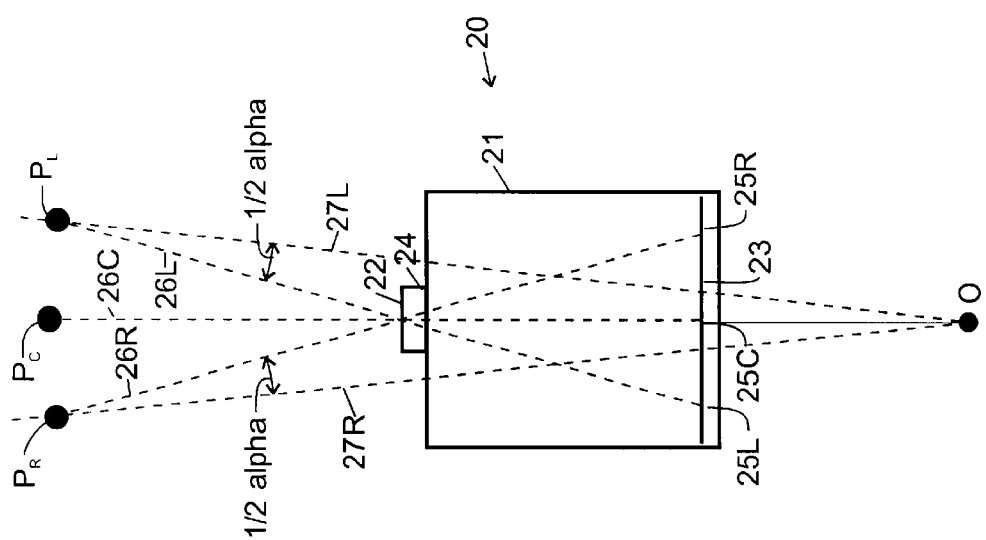

Before describing a system in accordance with the invention, it would be useful to describe how panoramic mosaic images comprising a stereoscopic panoramic image pair are generated. This will be done in connection with FIGS. 2A through 2C. FIG. 2A is a top plan view depicting details of the interior of camera 20, as seen from the top. With reference initially to FIG. 2A, camera 20 includes a housing 21 having a forward aperture 22, a rear image recording medium 23, and a shutter 24. The image recording medium 23, which defines an image plane for the camera 20, may comprise any convenient image recording medium, including film, a CCD array, or the like. The camera 20 may also include a lens (not shown) in the aperture 22 to facilitate focusing of images on the image plane. Alternatively, the camera 20 may comprise a pinhole camera, in which case no lens will be provided.

The shutter 24 is provided to selectively allow light reflected from portions of a scene at which the camera 20 is directed is allowed to enter the camera and project upon the screen 22 and portions of the image recording medium 23 for recording thereby. Three points from the scene, namely points $P_R$, $P_C$ and $P_L$, are depicted in FIG. 2A. The scene forms part of a panoramic scene which is centered on an axis defined by a center of rotation "O" for the camera 20. Preferably, the shutter 24 will be closed while the motor 16 moves the camera 20 from one step to the next, thereby to block light from the scene from entering the camera 20 and exposing the image recording medium 23 during such movement, which might otherwise cause blur in the recorded image. After the camera 20 has been moved to the next step stopped moving, the shutter 24 can be opened to allow light from the scene to enter the camera and be directed rearwardly toward the image recording medium 23. After the image recording medium 23 has been appropriately exposed, the shutter can be closed, and the camera 20 stepped to a new orientation, at which point these operations can be repeated. Preferably, if the image recording medium 23 is film, the film will be advanced before the shutter 24 is again opened so as to avoid double-exposure; similarly, if the image recording medium 23 is a CCD device, the image information can be retrieved and stored and the CCD's refreshed as necessary to avoid double exposure. The image recorded by the camera 20 at the respective steps will be independent of each other, so as to avoid multiple exposures.

As is conventional, light rays different portions of the scene 26 will be directed to different portions of the image recording medium 23 for recording thereby. For example, light rays 26R, 26C and 26L from respective points $P_R$, $P_C$ and $P_L$ of the scene project onto respective points 25R, 25C and 25L, as shown in FIG. 2A, of the image recording medium 23 for recording thereby. Comparing FIG. 2A with FIG. 1A, it will be appreciated that the point PR as recorded by the point 25R of the image recording medium 23 is from a direction that corresponds to the direction that an observer's right eye would be viewing that point $P_R$ of the scene if he or she were looking directly at the point $P_R$ of the scene, for some angular position of his or her head. Similarly, the point $P_L$ of the scene as recorded by the point 25L of the image recording medium is from a direction that corresponds to the direction that the observer's left eye would be viewing that point $P_L$ of the scene if he or she were looking directly at the portion 26L of the scene, for some angular position of his or her head. It will further be appreciated that, preferably the placement of the camera 20 relative to the center of rotation "O" will be such that, as the camera 20 is rotated, the points on the plane of image recording medium 23 will revolve through a circle, namely, an image circle, and the which maintain the same angular position as rays 26R and 26L will be tangent to an inner viewing circle similar to that described above in connection with FIGS. 1A and 1B. Both the image circle and the viewing circle will be centered on the center of rotation "O." Since the ray 26C is orthogonal to the image plane of the image recording medium 23, that ray will not be tangent to a viewing circle.

Figure 2B:
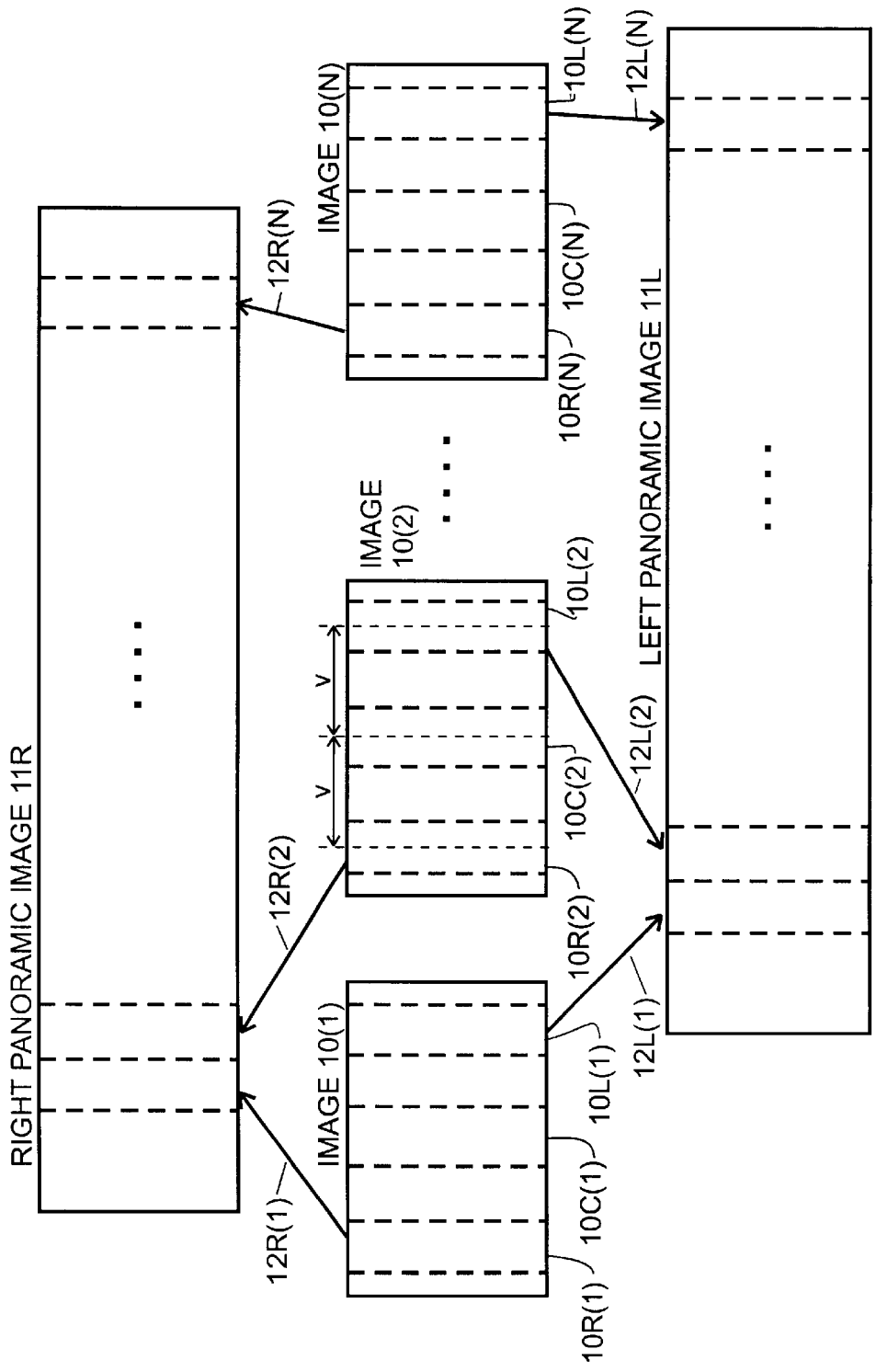

The generation of left and right panoramic mosaic images from the images recorded by the camera 20 will be described in connection with FIG. 2B. With reference to FIG. 2B, that FIG. depicts a series of images 10(1) through 10(N) (generally identified by reference numeral 10(n)) recorded at "N" (where "N" is an integer) successive steps around the center of rotation "O." Each image includes a left image strip 10L(n) and a right image strip 10R(n) located a distance "v" from the center of the image. The left image strips 10L(1), 10L(2), ... 10L(N) from successive images 10(1), 10(2), ... 10(N) can be mosaiced together to form the left panoramic image 11L, as indicated by the arrows 12L(1), 12L(2), ... 12L(N). Similarly, the right image strips 10R(1), 10R(2), ... 10R(N) from successive images 10(1), 10(2), ... 10(N) can be mosaiced together to form the right panoramic image 11R, as indicated by the arrows 12R(1), 12R(2), ..., 12R(N). The mosaicing can be performed using any conventional technique for mosaicing images or portions of images together.

When an observer is viewing the left and right panoramic images 11L and 11R of the stereoscopic panoramic image pair, the portions of the images 11L and 11R that he or she is viewing simultaneously will not be from the same image. This will be clear from FIGS. 2A and 2C. With reference again to FIG. 2A, a right image strip 10R(n) includes a projection of point $P_R$ and the left image strip 10L(n) of the same image 10(n) includes a projection of point $P_L$. Accordingly, if an observer is viewing the portion of the right panoramic image 11R that was formed from right image strip 10R(n), in order for the observer to view the panorama stereoscopically, he or she will need to be viewing a portion of the left panoramic image 11L that also includes a projection of point $P_R$. This portion will be obtained from an image 10(n') that is recorded at an angle with respect to the angle at which image 10(n) was recorded, the angle depending on the distance "v" from the center of the image 10(n) to the strip 12(n) in image 10(n) that included point 25R, and the distance from the center of the image 10(n') to the strip 12(n') in image 10(n) that also included point 25R. This will be clear from FIG. 2C. With reference to FIG. 2C, that FIG. depicts the camera 20 at two different angular positions around the center of rotation "O." The camera 20 at one angular position is schematically depicted in solid lines, and at the other angular position the camera is depicted in dashed lines. With the camera 20 in the first angular position, the point $P_R$ projects onto point 25R(n) of the image recording medium, and with the camera 20 in the second angular position, the point $P_R$ projects onto point 25L(n') of the image recording medium. Accordingly, for the observer to observe the panorama stereoscopically, he or she will be simultaneously viewing the portion of the right panoramic mosaic image 12R that includes point 25R(n) and the portion of the left panoramic mosaic image that includes point 25L(n'). FIG. 2C also depicts the disparity alpha (α).

Figure 3:
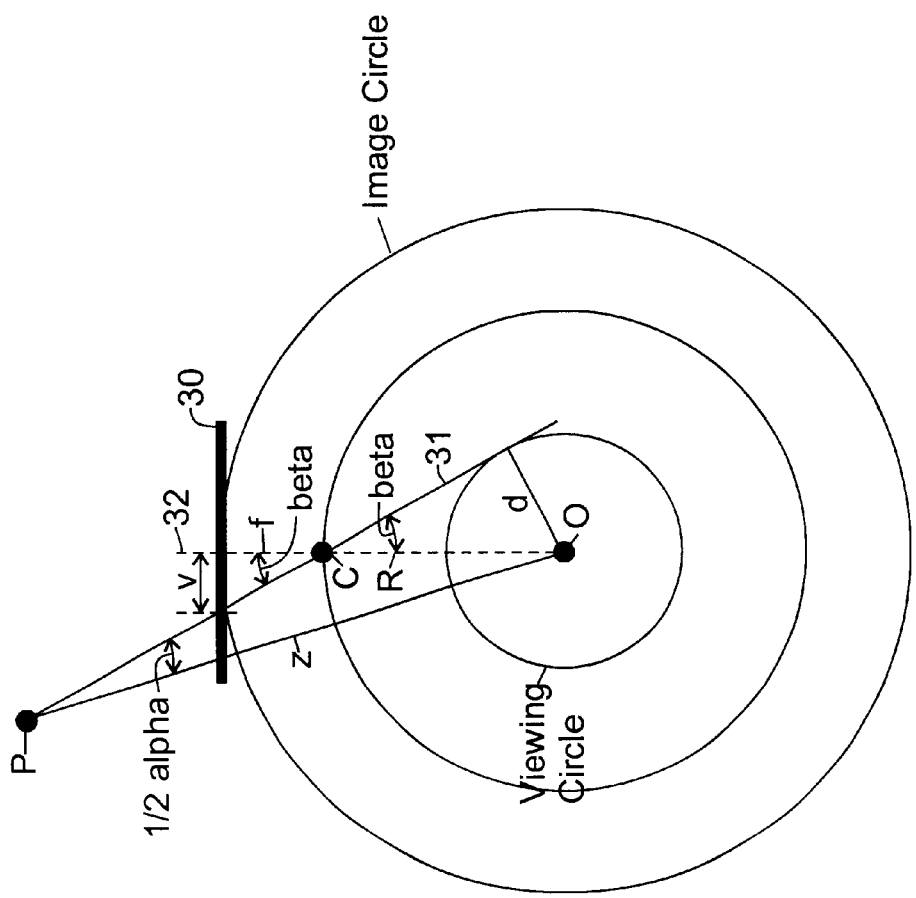
FIG. 3 is useful in understanding the relationship between the disparity for a point at an arbitrary location relative to an image recording medium and other variables related to the processes of acquiring an image of point on the image recording medium.

The relationship between the disparity alpha (α) for a point P at an arbitrary location relative to an image plane, and other variables related to the processes of acquiring an image of point P on an image recording medium will be described in connection with FIG. 3. With reference to FIG. 3, that FIG. schematically depicts an image recording medium 30 associated with a camera having a center of projection C rotated on an arm of radius R around a center of rotation O. In that case, if a strip for the respective panoramic image of the stereoscopic panoramic image pair is centered on a distance "v" from the center of the image recording medium 30, a line 31 extending through point P and tangent to the viewing circle makes an angle beta (β) to a line 32 normal to the image plane (and extending through the center of rotation O). It will be appreciated that, if "d" is the radius of the viewing circle 32, the angle β is related to the viewing circle radius "d" and the distance "R" between the center of rotation "O" of the camera 20 and the camera's center of projection "C" by $$d = R \sin(\beta) \tag{1}$$

In addition, since the distance from the image recording medium 30 to the center of projection C corresponds to the focal length "f" of the camera 20, the angle "β" is related to the distance "v" from the center of the image plane 30 to the point at which line 31 intersects the image plane 30, and the focal length "f" by $$\beta = \tan^{-1}\left(\frac{v}{f}\right). \tag{2}$$

Finally, the angle alpha (α) is related to the diameter "d" of the viewing circle 32 and the distance "z" from point P to the center of rotation O of the camera by $$d = z \sin\left(\frac{\alpha}{2}\right). \tag{3}$$

Rearranging equation (3) to solve for the angle alpha (α) yields $$\alpha = 2\sin^{-1}\left(\frac{d}{z}\right). \quad (4)$$

Substituting equation (2) into equation (1), and that result into equation 4, the angle α comprising the disparity is related to "v," "f" and "z" by $$\alpha = 2\sin^{-1}\left(\frac{d}{z}\right) = 2\sin^{-1}\left(\frac{R}{z}\sin\left(\tan^{-1}\left(\frac{v}{f}\right)\right)\right). \quad (5)$$

An examination of equation (5) indicates that, since all points whose images are recorded by the image recording medium 30 will be outside of the circle made by rotating the camera's center of projection "C" around the center of rotation "O," "R" is always less than "z." In addition, since the value of the factor $$\sin\left(\tan^{-1}\left(\frac{v}{f}\right)\right)$$

is always between zero and one, so the value of $$\frac{R}{z}\sin\left(\tan^{-1}\left(\frac{v}{f}\right)\right)$$

will also always be between zero and one. It will be appreciated that the length "R" of the arm between the center of rotation O of the camera and the camera's center of projection "C" can be changed when the images are recorded, which can result in the disparity being increased or decreased according to equation (5). Generally, however, and with particular attention to the present invention, if the length "R" of the arm between the center of rotation O of the camera and the camera's center of projection "C" and the focal length "f" of the camera are both fixed, for a given distance "z"

(a) increasing "v," the distance from the center of the image recording medium 30 to the strip that contains the image of point P, will generally increase the disparity alpha (α), and (b) decreasing "v," the distance from the center of the image recording medium 30 to the strip that contains the image of point P, will generally decrease the disparity alpha (α).

Thus, and with reference to FIG. 2B, the disparity alpha (α) for image of a point P in the stereoscopic panoramic image pair can be increased by increasing the distance "v" from the center of one or both of the images 10(n), 10(n') from which the respective strips 12R(n), 12L(n') are obtained for the portions of the left and right panoramic images 11L, 11R that contain point P. Similarly, the disparity alpha (α) for image of a point P' in the stereoscopic panoramic image pair can be decreased by decreasing the distance "v" from the center of one or both of the images 10(n"), 10(n''') from which the respective strips 12R(n"), 12L(n''') are obtained for the portions of the left and right panoramic images 11L, 11R that contain point P'.

For example, if it is desired to increase the disparity alpha (α) for a point P by a selected amount, that can be accomplished by identifying the pair of images 10(n), 10(n') onto which the point P is projected at the distance "v" from the center required for the selected amount (reference equation (5)), and obtaining a respective strip 12R(n), 12L(n') that contains the projection of point P therefrom. On the other hand, if it is desired to decrease the disparity alpha (α) for a point P' by a selected amount, that can be accomplished by identifying the images 10(n"), 10(n''') onto which the point P' is projected at the distance "v" from the center required for the selected amount (reference equation (5)), and obtaining a respective strip 12R(n'''), 12L(n''') that contains the projection of point P' therefrom. In either case, it will be appreciated that the disparity of the other points in the respective strips will also be increased or decreased, with the amount being dependent on the distance "z" from the center of rotation "O" to the respective other point. It will also be appreciated that, if there is no image 10(n), 10(n"), 10(n''') 10(n''') that contains a projection of the point P or P' at precisely the required distance "v" as specified in equation (5), the image can be selected for which the distance from the center to the projection of point P, P' is proximate the amount specified by equation (5).

Alternatively, it may be desired to increase the disparity alpha (α) for a point P by at least a selected amount, to, for example, ensure that the disparity is sufficient so as to provide a stereoscopic sensation. In that case, it would be necessary to identify the pair of images 10(n), 10(n') onto which the point P is projected at a distance "v" from the center that is at least that required by equation (5), and obtaining a respective strip 12R(n), 12L(n') that contains the projection of point P therefrom. Similarly, if it is desired to decrease the disparity alpha (α) for a point P by a selected amount, it would be necessary to identify the pair of images 10(n), 10(n') onto which the point P is projected at a distance "v" from the center that is at most that required by equation (5), and obtaining a respective strip 12R(n), 12L(n') that contains the projection of point P therefrom.

Generally, the operations of selecting values for "v" for the respective strips to be obtained from the respective images will be performed for at least one point in each strip. If it is desired to increase the disparity for the point, the value for "v" will be increased. On the other hand, if it is desired to decrease the disparity, the value for "v" will be decreased.

In addition, it will be appreciated that, if, as will generally be the case, the disparity alpha (α) is relatively small, if it is desired to adjust the disparity by a particular factor, that can be approximated by adjusting the distance "v" by the same factor.

Figure 4:
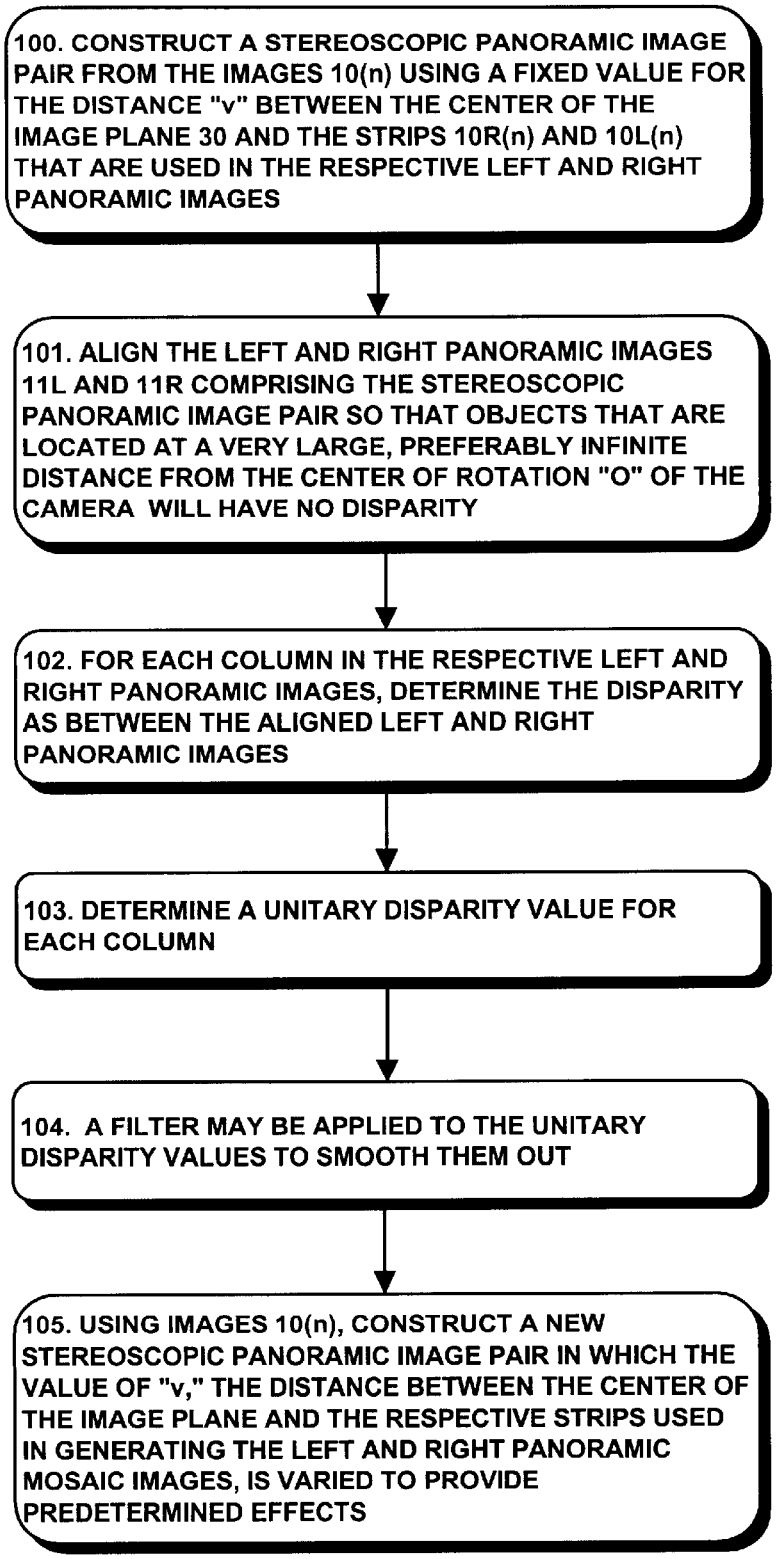
FIG. 4 depicts a flow chart of operations performed in connection with generating a stereoscopic panorama image pair in which disparity is automatically controlled to provide selected effects.

The invention provides an arrangement for controlling the disparity of points of a scene, projections of which are recorded in a stereoscopic panoramic image pair. Operations performed in connection with generating a stereoscopic panoramic image pair for which disparity is automatically controlled will be described in connection with the flow chart depicted in FIG. 4. With reference to FIG. 4, a stereoscopic panoramic image pair is initially constructed from the images 10(n) (reference FIG. 2B) using a fixed value for the distance "v" between the center of the image plane 30 and the strips 10R(n) and 10L(n) that are used in the respective left and right panoramic images (step 100). After the left and right panoramic images 11L and 11R comprising the stereoscopic panoramic image pair have been generated, the images are aligned so that objects that are located at a very large, preferably infinite distance from the center of rotation "O" of the camera will have no disparity (step 101). For each column in the respective panoramic images, the disparity is determined as between the aligned left and right panoramic images (step 102). In one embodiment the left and right panoramic mosaic images 11L and 11R are in the form of arrays of picture elements, or "pixels," p(1,1), . . . , p(R,C) arranged in a plurality of rows 1, ..., R (from top to bottom, generally "r") and columns 1, ..., C (from left to right, generally "c"). In performing step 102, in that embodiment, the disparity is determined at predetermined ones of the rows of pixels; in one such embodiment, the disparity is determined at three selected rows $r_S$, including a row $r_M$ at or near the middle, a row in the upper half $r_U$ and a row in the lower half $r_L$. For each pixel $p(r_X, c_Y)$ (X=M, U, or L, Y=1, ..., C) for which a disparity value is to be determined, the disparity is determined as the number of columns separating the projection of the point from the scene onto the left panoramic mosaic image 11L and the projection of the same point onto the right panoramic mosaic image 11R in the aligned stereoscopic panoramic image pair. The amount of disparity represented by each column depends on the pixel resolution of the left and right panoramic mosaic images 11L and 11R.

After determining a disparity value for a column (reference step 102), a unitary disparity value will be determined for the respective column (step 103). The disparity value generated for each respective column can be a selected function of the disparity values determined for the column, and perhaps of disparity values for neighboring columns, but in one embodiment, the disparity value for a column is selected to be the maximum of the disparity values that are generated for the column in step 102. The maximum is selected in step 103 since in subsequent steps it will be desired to provide that the maximum disparity is small enough that the panoramic image pair will provide stereoscopic viewing when the left and right panoramic mosaic images are viewed by a viewer. The unitary disparity value for a column can be determined after the disparity values have been determined for the column, and perhaps other columns as necessary. Alternatively, the unitary disparity value for a column can be determined after the disparity values have been determined for a number of columns, and perhaps all of the columns. The unitary disparity values that are determined for the proximate columns can vary widely, and a filter can be applied to the unitary disparity values to smooth them out (step 104).

After the filtered disparity values have been generated (step 104), the filtered disparity values are used to construct, from the images 10(n), a new stereoscopic panoramic image pair in which the value of "v," the distance between the center of the image plane and the respective strips used in generating the left and right panoramic mosaic images is varied to provide predetermined effects (step 105). For example, in step 105, a stereoscopic panoramic image pair can be generated in which the maximum filtered disparity is within the human stereo fusion limits of the human brain. In that operation, the system can adjust the distance "v" from strip to strip so as to scale the maximum disparity of the columns comprising the strip.

Alternatively, a stereoscopic panoramic image pair can be generated in step 105 in which the filtered disparities of all of the regions in the panorama are compressed to a relatively narrow range. In that operation, the system can, for example, decrease the distance "v" to decrease the disparity in regions in which the filtered disparity values determined in step 104 are relatively high, and increase the distance "v" to increase the disparity in regions in which the filtered disparity values are relatively low.

Other operations in connection with step 105 will be apparent to those skilled in the art.

The invention provides a number of advantages. In particular, the invention provides an arrangement for generating a stereoscopic panoramic image pair in which disparity can be automatically adjusted to, for example, ensure that the minimum disparity for objects at a finite distance in a panoramic scene is at least the disparity required for human stereo fusion, that the disparity for all objects is within a predetermined range, or to provide other effects as will be apparent to those skilled in the art.

It will be appreciated that numerous changes may be made to the system described herein. For example, the camera can be any type of camera, including still cameras, movie cameras and video cameras, and may record images using any form of image recording medium, including but not limited to film, electronic devices such as CCD's, and any other material that can facilitate recording of images.

As described above in connection with step 103, the unitary disparity value generated for each column of pixels corresponds to the maximum disparity value as determined for the respective column. Instead of determining a unitary disparity value for each column, a unitary disparity value can be determined for a plurality of proximate columns, which may be any convenient function of the disparity values, including, for example, the maximum disparity value for all of the plurality of columns, a bounded average of the maximum disparity values or the like. Alternatively, the unitary disparity value may also be a function of the other disparity values determined for the column or columns.

As described above in connection with step 104, a filter can be applied to smooth out unitary disparity values for respective ones of the columns. In one embodiment, a median filter is used, although it will be appreciated that other types of filters may be used. Alternatively, the unitary disparity values can be used without a filter being applied.

It will be appreciated that a system for constructing left and right panoramic images 10L and 10R comprising a stereoscopic panoramic image pair in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Furthermore, it will be appreciated that the operations performed in generating the left and right panoramic images 10L and 10R can be performed in whole or in part manually.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for generating a stereoscopic panoramic image pair comprising left and right panoramic mosaic images for use in facilitating stereoscopic viewing of a panoramic scene, the system comprising:

A. a panoramic image generator configured to mosaic together respective left and right image strips from respective ones of a plurality of images to form the respective left and right panoramic images, the panoramic image generator being configured to use strip separation values for the respective images to determine the separation of the respective left and right image strips in generating the respective left and right panoramic images; and B. a strip separation value generation module configured to generate, for respective ones of said images, the strip separation values so as to provide at least one selected disparity for objects in the panoramic scene.

2. A system as defined in claim 1 in which said strip separation value generation module is configured to generate strip separation values so as to provide for a selected maximum disparity for objects in the panoramic scene.

3. A system as defined in claim 1 in which said strip separation value generation module is configured to generate strip separation values so as to provide for a selected minimum disparity for objects in the panoramic scene.

4. A system as defined in claim 1 in which said strip separation value generation module is configured to generate strip separation values so as to provide for a selected disparity range for objects in the panoramic scene.

5. A system as defined in claim 1 in which the strip separation value generation module comprises:
   A. an initial disparity value generator configured to process respective initial left and right panoramic images generated by said panoramic image generator using a predetermined strip separation value for all said images to generate initial disparity values for projections of at least some points in the scene;
   B. a separation value generator configured to generate the strip separation values from the initial disparity values.

6. A system as defined in claim 5 in which the separation value generator generates the strip separation values in relation to a scaling of at least one initial disparity value.

7. A system as defined in claim 5 in which each of said initial left and right panoramic images comprises a plurality of pixels arrayed in a plurality of rows and columns, the initial disparity value generator being configured to determine initial disparity values for pixels in at least some of said columns.

8. A system as defined in claim 7 in which the initial disparity value generator is configured to determine, for at least one of said columns, the initial disparity value as the maximum of the disparities for pixels in at least some of the rows in said at least one of said columns.

9. A system as defined in claim 7 in which the initial disparity value generator is configured to determine, for at least one of said columns, the initial disparity value as the minimum of the disparities for pixels in at least some of the rows in said at least one of said columns.

10. A system as defined in claim 7 in which the initial disparity value generator is configured to determine, for at least one of said columns, the initial disparity value as a selected function of the disparities for pixels in at least some of the rows in said at least one of said columns.

11. A system as defined in claim 5 in which the strip separation value generation module further includes a filter module configured to filter the initial disparity values, the separation value generator being configured to use the filtered initial disparity values in generating the strip separation values.

12. A method generating a stereoscopic panoramic image pair comprising left and right panoramic mosaic images for use in facilitating stereoscopic viewing of a panoramic scene, the method comprising
   A. an initial panoramic image generation step in which respective left and right image strips from respective ones of a plurality of images are mosaiced together to form the respective left and right panoramic images, during the initial panoramic image generation step a predetermined strip separation value being used to determine the separation of the respective left and right image strips in generating the respective left and right panoramic images;
   B. an initial disparity value generation step in which respective initial left and right panoramic images are processed to generate initial disparity values for projections of at least some points in the scene;
   C. a separation value generation step in which final strip separation values are generated from the initial disparity values, and
   D. a final initial panoramic image generation step in which respective left and right image strips from respective ones of said plurality of images are mosaiced together to form the respective left and right panoramic images, during the final panoramic image generation step the final strip separation values being used to determine the separation of the respective left and right image strips in generating the respective left and right panoramic images.

13. A method as defined in claim 12 in which, during the separation value generation step, the final strip separation values being generated in relation to a scaling of at least one initial disparity value.

14. A method as defined in claim 12 in which each of said initial left and right panoramic images comprises a plurality of pixels arrayed in a plurality of rows and columns, during the initial disparity value generation step the initial disparity values being determined for pixels in at least some of said columns.

15. A method as defined in claim 14 in which, during the initial disparity value generation step, the initial disparity value for at least one of said columns being determined as the maximum of the disparities for pixels in at least some of the rows in said at least one of said columns.

16. A method as defined in claim 14 in which, during the initial disparity value generation step, the initial disparity value for at least one of said columns being determined as the minimum of the disparities for pixels in at least some of the rows in said at least one of said columns.

17. A method as defined in claim 14 in which, during the initial disparity value generation step, the initial disparity value for at least one of said columns being determined as a selected function of the disparities for pixels in at least some of the rows in said at least one of said columns.

18. A method as defined in claim 12 in which the strip separation value generation step includes the step of filtering the initial disparity values, the separation value generation step including the step of using the filtered initial disparity values in generating the strip separation values.

19. A computer program product for use in connection with a programmable device to facilitate generation of a stereoscopic panoramic image pair comprising left and right panoramic mosaic images for use in facilitating stereoscopic viewing of a panoramic scene, the computer program product comprising a device-readable medium having encoded thereon:
   A. a panoramic image generation module configured to enable said programmable device to mosaic together respective left and right image strips from respective ones of a plurality of images to form the respective left and right panoramic images, the panoramic image generation module being enabled to use a selected strip separation value to determine the separation of the respective left and right image strips in generating the respective left and right panoramic images;

B. an initial disparity value generation module configured to enable said programmable device to process respective initial left and right panoramic images to generate initial disparity values for projections of at least some points in the scene;

C. a separation value generation module configured to enable said programmable device to generate final strip separation values from the initial disparity values, and D. a control module configured to (i) enable programmable device to utilize said panoramic image generation module, in a process initially using a predetermined strip separation value in generating initial left and right panoramic images for use by said initial disparity value generation module, and (ii) after the final strip separation values have been generated, enable the programmable device to utilize said panoramic image generation module, in the process using the final strip separation value in generating final left and right panoramic images.

20. A computer program product as defined in claim 19 in which separation value generation module is configured to enables said programmable device to generate the final strip separation values in relation to a scaling of at least one initial disparity value.

21. A computer program product as defined in claim 19 in which each of said initial left and right panoramic images comprises a plurality of pixels arrayed in a plurality of rows and columns, the initial disparity value generation module being configured to enable the programmable device to determine the initial disparity values for pixels in at least some of said columns.

22. A computer program product as defined in claim 21 in which the initial disparity value generation module is configured to enable the programmable device to determine the initial disparity value for at least one of said columns as the maximum of the disparities for pixels in at least some of the rows in said at least one of said columns.

23. A computer program product as defined in claim 21 in which the initial disparity value generation module is configured to enable the programmable device to determine the initial disparity value for at least one of said columns as the minimum of the disparities for pixels in at least some of the rows in said at least one of said columns.

24. A computer program product as defined in claim 21 in which the initial disparity value generation module is configured to enable the programmable device to determine the initial disparity value for at least one of said columns as a selected function of the disparities for pixels in at least some of the rows in said at least one of said columns.

25. A computer program product as defined in claim 19 in further comprising a filtering module configured to enable the programmable device to filter the initial disparity values, the separation value generation module enabling the programmable device to, when processing separation value generation module, make use of the filtered initial disparity values in generating the strip separation values.

* * * * *